3,219,723
PROPYLENE DIMERIZATION
Lewis W. Hall, Jr., Claymont, Del., assignor to Sun Oil Company, Philadelphia, Pa., a corporation of New Jersey
No Drawing. Filed Mar. 14, 1963, Ser. No. 265,068
4 Claims. (Cl. 260—683.15)

This application is a continuation-in-part of copending application Serial No. 127,127, filed July 27, 1961, and now abandoned.

This invention relates to the preparation of methylpentenes by the dimerization of propylene under certain catalytic reaction conditions.

The catalytic polymerization of propylene ordinarily results in a mixture of polymerization products which vary considerably in molecular weight and which may range from liquid to solid polymers. Recently certain types of catalysts have been developed which have the unique property of dimerizing propylene forming hexenes as the major product. These dimerization products which are primarily methylpentenes are highly desired as high octane components of motor fuels. Certain of the methylpentenes particularly 4-methylpentene-1 are useful as monomers in the production of polyolefin resins.

It has generally been disclosed in the prior art that alkali metal catalysts including lithium, sodium, potassium, rubidium and cesium are suitable for dimerizing propylene to produce methylpentenes. These prior art catalysts may be in the form of liquid metal, as a film on an inert support or as a solid metal catalyst.

Although it has been suggested that any alkali metal is suitable for dimerizing propylene, it has been found that in the absence of a second reactive material not all of the alkali metals are equivalent in their ability to dimerize propylene. For example, it is well known that potassium either alone or on an inert support will dimerize propylene to form methylpentenes. The predominating isomer which is formed is 4-methylpentene-1. On the other hand, sodium, either alone or on an inert support, will not dimerize propylene to form any methylpentenes.

The present invention is directed to a method of dimerizing propylene under conditions such that methylpentenes are the major product of the reaction and sodium is the primary catalytic component.

According to the invention, propylene is dimerized by contacting it with a catalyst system prepared by reacting sodium with an alkyl chloride containing 2–10 carbon atoms. Preferably the two reactants are used in approximately stoichiometric amounts. The resulting catalyst is a mixture of a sodium alkyl and sodium chloride which components appear to form some sort of complex. Any alkyl chloride having from two to ten carbon atoms can be used in forming the catalyst. Examples are ethyl chloride, n-propyl chloride, isobutyl chloride, n-amyl chloride, hexyl chloride, octyl chloride and decyl chloride. On the other hand, the bromine and iodine analogues of these halides are inoperative for the present purpose, as their reaction products with the sodium are ineffective as catalysts for dimerizing propylene.

Contact of the propylene with the catalyst system can be carried out either in the presence or absence of an inert reaction medium such as pentane, heptane, octane, decane, benzene or any hydrocarbon solvent which is inert to the catalyst. The temperature of contact should be in the range of 100–250° C. and preferably 150–200° C. The operation can be conducted batchwise or in a flow reactor either with the hydrocarbons and catalyst both flowing therethrough or with the hydrocarbons passing through a bed of the catalyst. After separation of the hydrocarbon reaction product from the catalyst, the methylpentenes can be recovered in pure form by distillation.

The reaction product of the present process is composed of a mixture of methylpentene isomers, the proportions of which vary dependent upon the particular reaction conditions used. Short reaction times tend to favor the formation of 4-methylpentene-1 while longer reaction times tend to cause the formation of other methylpentene isomers such as 2-methylpentene-2 and 4-methylpentene-2.

The following examples illustrate the invention more specifically.

*Example I*

A catalyst was prepared by dispersing 3.0 grams of sodium metal and 50.0 grams of sodium chloride (100–230 mesh). This catalyst was charged into a 300 cc. rocker bomb along with 50 cc. of dry heptane and 60 cc. of liquid propylene. The reaction mass was heated at 200° C. for 9 hours under a pressure of 825 p.s.i. No pressure drop was observed during the reaction period and upon removal of the contents from the bomb and analysis thereof, no hexenes were found, thus indicating no dimerization occurred and that elemental sodium on sodium chloride is an inactive catalyst with respect to its dimerization ability for propylene.

*Example II*

The catalyst in this example was prepared by dispersing sodium in Decalin, diluting with heptane, chilling the mixture to −10° C. and adding a stoichiometric amount of n-amyl chloride. The resulting dispersion contained n-amyl sodium in approximately 0.75 molar amount. 75 ml. of the dispersion were added to a 300 ml. rocking autoclave and about 40 g. of propylene were introduced therein. The mixture was heated to 150° C. and agitated at that temperature for 2.5 hours. The bomb was then cooled and unreacted propylene was vented. The remaining material was admixed with 50 ml. of methanol to destroy the catalyst and the hydrocarbon product was water washed. The resulting product was distilled and the distillate boiling in the range of 50–90° C. was analyzed by vapor phase chromatography. The foregoing procedure was repeated twice except that reaction times of 4.5 and 6.5 hours were used. Results were as follows:

| Reaction time, hrs. | Percent conversion | Product distribution, percent | | | |
|---|---|---|---|---|---|
| | | 4-MP*-1 | 4-MP-2 | 2-MP-1 | 2-MP-2 |
| 2.5 | 51.9 | 43.3 | 49.4 | 1.1 | 6.1 |
| 4.5 | 65.0 | 20.6 | 61.1 | 3.2 | 15.1 |
| 6.5 | 69.3 | 18.8 | 61.5 | 2.8 | 16.9 |

*MP=methylpentene.

These results show that the conversion of propylene to methylpentenes increases as the reaction time is increased but that the concentration of 4-methylpentene-1 in the reaction product concurrently decreases.

I claim:

1. Method of dimerizing propylene to form a major amount of a mixture of 4-methylpentene-1 and 4-methylpentene-2 which comprises contacting propylene at a temperature in the range of 100 to 250° C. with a catalyst consisting essentially of the complex prepared by reacting sodium with an alkyl chloride containing 2 to 10 carbon atoms.

2. Method according to claim 1 wherein the temperature is in the range of 150 to 200° C.

3. Method of dimerizing propylene to form a major amount of a mixture of 4-methylpentene-1 and 4-methylpentene-2 which comprises contacting propylene at a temperature in the range of 100 to 250° C. with a catalyst consisting essentially of the complex prepared by reacting sodium with normal amyl chloride.

4. Method according to claim 3 wherein the temperature is in the range of 150 to 200° C.

References Cited by the Examiner

UNITED STATES PATENTS

| | | | |
|---|---|---|---|
| 2,548,803 | 4/1951 | Little | 260—671 X |
| 2,751,426 | 6/1956 | Closson et al. | 260—683.15 |
| 2,804,489 | 8/1957 | Pines et al. | 260—683.2 |
| 2,834,818 | 5/1958 | Schmerling et al. | 252—476 X |
| 2,994,725 | 8/1961 | Shaw et al. | 260—671 X |
| 3,075,027 | 1/1963 | Bittner et al. | 260—683.15 |

ALPHONSO D. SULLIVAN, *Primary Examiner.*

PAUL M. COUGHLAN, *Examiner.*